Patented Oct. 14, 1947

2,429,175

UNITED STATES PATENT OFFICE 2,429,175

COATED WELDING ROD

Paul Christiaan van der Willigen, Johannes Jacobus Kreupeling, and Johan Jacob de Jong, Eindhoven, Netherlands, assignors to Hartford National Bank & Trust Co., Hartford, Conn., as trustee No Drawing. Application September 5, 1945, Serial No. 614,596. In the Netherlands August 8, 1942

Section 1, Public Law 690, August 8, 1946.
Patent expires August 8, 1962

9 Claims. (Cl. 219—8)

This invention relates to a coated welding rod for electric arc welding, in which coated rod part of the welding metal is contained in the slag-forming coating.

It has been suggested before with coated welding rods that if alloy constituents are desired in the weld they should be introduced into the coating material in the shape of metal powder. It is also known to embody metal powder, such as iron powder, in a welding rod coating in order to neutralise the action of the atmosphere on the molten core metal, particularly oxidation, during the welding operation. In both of the foregoing instances, the conditions are so chosen that during the welding operation the molten metal is essentially received from the core and only to a minor part from the coating.

In addition, it has been suggested to provide the coating of a welding rod with a helically wound metal wire electrically insulated from the core by the coating mass. During the welding the current is supplied to the core only. Whereas in the case of coated welding rods the metal of the coating is within or at least in close proximity to the arc and is thereby melted within the arc region directly by the arc, in the case of rods provided with helically wound wire as above noted, the melting of the metal of the wire takes place outside the arc region and is effected by heat radiated from the arc.

A disadvantage of welding rods of the last-mentioned kind is that after interruption of the arc consequent upon the formation of a deep crater within the end of the rod, the arc can only be re-ignited with great difficulty. Furthermore, while such wire coated rods bring about a saving in electrical energy and are characterized by less burning and disintegration of the welding metal than normal coated rods, the wire coated rods are more difficult to manufacture.

The invention has for its object to obviate the said disadvantages while conserving the said advantages.

The invention consists in a coated welding electrode for electric arc-welding in which the slag-forming coating contains more than 35% by weight of the welding metal in a divided state for example in the form of a powder or of grains. As the core of the welding rod is an element having current passing through it, it goes without saying that it is bound by minimum dimensions. For this purpose it is generally desirable that the core should constitute more than about 15% by weight of the welding metal.

In connection with the object of the invention wherein the metal present in the coating is used as far as possible for the formation of the weld the slag-forming part of the coating is adjusted to the total quantity of the metal to be melted. In view thereof, the use should be avoided of a slag-forming material which may have a harmful effect, for example by oxidation of the welding metal in the coating. Suitable slag-forming materials are, for example, silicate-containing materials.

Any alloy-constituents that may be desired in the weld may be used either in the core or in the coating.

In welding by means of a welding rod according to the invention only comparatively small metal losses are incurred as in the case of the usual coated welding rods so that the distribution of the metal in the weld received from the core or the coating respectively is approximately identical with that in the welding rod itself.

The burning of a small part of the welding metal which in welding cannot be entirely avoided can be slightly reduced by providing the coating containing the metal particles with a supplementary layer consisting solely of slag-forming material.

Similarly to the welding rods having a normal coating the welding rods according to the invention can be coated simply by moulding. This renders the manufacture easier than that of the above-described welding rods having a helically coiled metal wire in the coating since the formation and the embedding of a helically wound wire is thus dispensed with.

In addition, the welding-rod construction according to the invention is advantageous when the weld is to contain highly oxidisable alloy constituents such as Ti or Mg. These constituents can be added to the coating in the form of particles alloyed with a large amount of welding metal. In this case the oxidation will be less than if the said substances are used either directly as a powder in the coating or as an alloy constituent in the core if the latter contains less metal than the coating. Since the alloy constiuent may be added as a powder or the like to the coating of the rod of the invention, the construction according to the invention makes it possible to use such constituents notwithstanding the fact that the said constituent can only be made into a core wire with great difficulty or cannot be worked up at all.

A rather important additional advantage of the welding rods of the invention which becomes manifest during the welding operation, is that although with the welding rods provided with a helically wound metal wire in the coating the arc after interruption can only be re-ignited with great difficulty due to the formation of a very deep crater, such reignition may be effected in a very simple manner with the welding rods according to the invention by breaking off the projecting part of the coating.

In addition, it has been found that the burning-in during the welding operation decreases as the core constitutes a smaller part of the total amount of welding metal. This phenomenon can be utilised in the manufacture of welding rods exhibiting a burning-in which is altered to conform to the composition and the form of the piece to be welded.

As the welding rods of the invention generally have a larger diameter than the usual welding rods it may be advantageous, for example in the manufacture of corner welds, to use welding rods having a slightly flattened cross-section.

Otherwise, the welding rods according to the invention have the above-mentioned advantages of welding rods having a helically wound metal wire in the coating.

*Example*

A mixture of:

| | Per cent |
|---|---|
| Iron sawdust sieved through a sieve having 10 meshes per cm | 78 |
| Clay | 10 |
| Titanium dioxide | 6 |
| Wood-flour | 3 |
| Calcium carbonate | 2 |
| Ferromanganese | 1 | is made in a kneading machine with the addition of siliceous varnish into a mouldable material. This material is then applied by moulding to an iron core wire of 3.25 mm. cross-sectional area in such a manner that the external diameter of the coating is 8 mms. The iron deposited in the weld of the work piece by means of a welding rod so constituted when using an alternating current of about 150 amperes derives about ⅔ from the coating and about ⅓ from the core wire.

What we claim is:

1. A welding rod for electric arc welding comprising a core of welding metal and an electrically-conductive coating on said core and comprising welding metal in a finely divided state, the amount of the welding metal in said coating being between about 35 to 85 percent by weight of the total welding metal in the said core and coating, said core constituting at least about 15 percent by weight of the welding metal of the rod.

2. A welding rod for electric arc welding comprising a core of welding metal and an electrically-conductive coating on said core and comprising welding metal in a finely divided state, the amount of the welding metal in said coating being between about 35 to 85 percent by weight of the total welding metal in the said core and coating, said core constituting at least about 15 percent by weight of the welding metal of the rod, said coating having an outside diameter at least two times the diameter of the said core.

3. A welding rod for electric arc welding comprising a core of welding metal and an electrically-conductive coating on said core and comprising an alloy of said welding metal and a readily oxidizable metal in a finely divided state, the amount of the welding metal in said coating being between about 35 to 85 percent by weight of the total welding metal in the said core and said coating, said core constituting at least about 15 percent by weight of the welding metal of the said rod.

4. A welding rod for electric arc welding comprising a core of welding metal and an electrically-conductive coating on said core and comprising welding metal in a finely divided state, the amount of the welding metal in said coating being between about 35 to 85 percent by weight of the total welding metal in the said core and said coating and a second coating of slag-forming material on said first coating.

5. A welding rod for electric arc welding comprising a core of welding metal and an electrically-conductive coating on said core and comprising welding metal in a finely divided state, the amount of the welding metal in said coating being between about 35 to 85 percent by weight of the total welding metal in the said core and said coating and a second non-metallic coating of slag-forming material on said first coating.

6. A coated welding rod for electric arc welding comprising a core of welding metal having a cross-sectional area of approximately 3.25 square millimeters and comprising at least about 15 percent by weight of the welding metal of the rod, a first electrically-conductive coating on said core and comprising welding metal in a finely divided state, the amount of the welding metal in said coating being between about 35 to 85 percent by weight of the total welding metal in the said core and coating and a second non-metallic coating of slag-forming material on the said first coating.

7. A welding rod for electric arc welding comprising a core of welding metal and an electrically-conductive coating on said core and comprising a mixture of approximately 78 percent of iron sawdust having a size equivalent to the apertures of a sieve having approximately 10 meshes per centimeter, approximately 10 percent of clay, approximately 6 percent of titanium dioxide, approximately 3 percent of wood flour, approximately 2 percent of calcium carbonate and approximately one percent of ferromanganese, said core constituting at least about 15 percent by weight of the welding metal of the rod and the iron dust in said coating constituting between about 35 to 85 percent by weight of the total welding metal in the said core and coating.

8. A welding rod for electric arc welding comprising an iron wire core of welding metal of a cross-sectional area of approximately 3.25 square millimeters and an electrically-conductive coating on said core having an external diameter of approximately 8 millimeters and constituting a mixture of approximately 78 percent of iron sawdust having a size equivalent to the apertures of a sieve having approximately 10 meshes per centimeter, approximately 10 percent of clay, approximately 6 percent of titanium dioxide, approximately 3 percent of wood flour, approximately 2 percent of calcium carbonate, approximately one percent of ferromanganese and a binder of siliceous varnish.

9. A welding rod for electric arc welding comprising a core of welding metal and an electrically conductive coating on said core and comprising welding metal in a finely divided state, the amount of the welding metal in said coating being between about 35 to 85 percent by weight of the total welding metal in the said core and coating, said core constituting at least 15 percent by weight of the welding metal of the rod, the thickness of the coating being greater than and the cross-sectional area of the core being smaller than the corresponding dimensions of a welding rod having a coating consisting substantially of slag-forming material and a core containing substantially all of the welding metal of the welding rod.

PAUL CHRISTIAAN van der WILLIGEN.
JOHANNES JACOBUS KREUPELING.
JOHAN JACOB de JONG.

REFERENCES CITED

The following references are of record in the file of this patent:

UNITED STATES PATENTS

| Number | Name | Date |
|---|---|---|
| 1,329,530 | Kinkead | Feb. 3, 1920 |
| 2,009,240 | Roberts et al. | July 23, 1935 |
| 1,241,899 | Armstrong | Oct. 2, 1917 |
| 1,845,029 | Meadowcroft | Feb. 16, 1932 |

FOREIGN PATENTS

| Number | Country | Date |
|---|---|---|
| 394,319 | Great Britain | June 9, 1933 |
| 520,731 | Great Britain | May 2, 1940 |